United States Patent [19]
Cross et al.

[11] 4,190,858
[45] Feb. 26, 1980

[54] METHOD FOR IMPROVED PERFORMANCE OF INFRARED VIDICON CAMERAS

[75] Inventors: Edward F. Cross, Los Angeles; Wilbur A. Garber, San Pedro, both of Calif.

[73] Assignee: The United States of America as represented by the Secretary of the Air Force, Washington, D.C.

[21] Appl. No.: 946,263

[22] Filed: Sep. 27, 1978

[51] Int. Cl.² .............................................. H04N 5/33
[52] U.S. Cl. ..................................... 358/113; 358/217
[58] Field of Search ................ 358/113, 217; 250/333, 250/351

[56] References Cited
U.S. PATENT DOCUMENTS

| | | | |
|---|---|---|---|
| 3,646,267 | 2/1972 | Tompsett | 358/113 |
| 4,100,574 | 7/1978 | Felix | 358/113 |

*Primary Examiner*—Richard Murray
*Attorney, Agent, or Firm*—Joseph E. Rusz; Henry S. Miller

[57] ABSTRACT

Infra red (IR) vidicon camera tube performance is improved by alternately switching the sensing layer voltage to one of two values in synchronism with the frame rate of an IR TV camera. In operation the sensing layer is switched to a high voltage for two frames and then switched to the normal voltage for one frame readout. Camera tube response is in real time, thereby eliminating need for change in scanning beam rate or subsequent data processing of recorded video data.

1 Claim, 5 Drawing Figures

|  | RCA TRICON No. | | G.E. IR VIDICON NO. 326 | | WESTINGHOUSE THERMICAN N6. | |
|---|---|---|---|---|---|---|
|  | NEH W/cm² | DYNAMIC RANGE DR. | NEH W/cm² | DYNAMIC RANGE DR. | NEH W/cm² | DYNAMIC RANGE |
| STEADY STATE | 5.1×10⁻⁷ | 127 | 2.2×10⁻⁶ | 15 | 3.6×10⁻⁴ | 181 |
| H/L | 1.7×10⁻⁷ | 265 2.5 MODE 5.4 NEH | 5.9×10⁻⁷ | 39 | 1.2×10⁻⁴ | 333 |
| HH/L | 9.5×10⁻⁸ | 316 | 3.1×10⁻⁷ | 48 3.2 MODE 7.0 NEH | 1.0×10⁻⁴ | 350 1.9 MODE 3.6 NEH |
| HHH/L | 9.1×10⁻⁶ | (348) | 2.7×10⁻⁷ | 52 | 7.6×10⁻⁵ |  |

FIG. 5

METHOD FOR IMPROVED PERFORMANCE OF INFRARED VIDICON CAMERAS

STATEMENT OF GOVERNMENT INTEREST

The invention described herein may be manufactured and used by or for the Government for governmental purposes without the payment of any royalty thereon.

BACKGROUND OF THE INVENTION

This invention relates generally to vidicon cameras and in particular to a new and improved method for operating such cameras which provides new and unexpected results.

Vidicon cameras are well known in the art and have been used with television systems for a number of years. One of the principal advantages of the vidicon is its simplicity and reliability. In situations where durability is of prime importance, the vidicon has proven the choice of most systems developers. Its lack of ultra sophistication makes it particularly adaptable for use in close circuit television systems for security purposes, as well as in manufacturing quality control.

The vidicon has also proven itself in the field of infra red detection. This relatively new and expanding field includes the gamut of applications from earth mapping to heat seeking missiles to quality control in manufacturing. Although some more expensive and complicated infra red detection systems exist, there is still the need for the infra red detecting vidicon and its simple, inexpensive operation.

As with any apparatus or system there is always an advantage if it can be operated in a manner that will not harm the device but will still improve its assigned result. So it is with the method of the instant invention, which will greatly improve the output of the infra red detecting vidicon without creating added expense or so complicating its operation that it is no longer practical for the desired task.

SUMMARY OF THE INVENTION

The invention is particularly suggested for use with vidicon camera tubes working in the infra red spectrum. A description of vidicon tubes and their operation may be found in the following publication, Photoelectronic Imaging Devices, by Biberman and Nudelman, 1971, Volume II, Page 263 etc.

Concerning the invention to be disclosed herein, the vidicon camera tube sensing layer may be considered to be an array of small leaky capacitors, each one equal in size to a picture element. Each element of the tube can be described electronically as a small capacitor $c_e$ of constant value shunted by a resistor $r_e$ which varies in value with irradiance level and sensing layer voltage $V_{sl}$. During standard tube operation each $c_e$ is fully charged in sequence by the scanning electron beam acting as a switch. A television frame time is $T_f$. During the elapsed time between two successive scans the charge on $c_e$ partially discharges through $r_e$ causing the potential on the beam side of the sensing layer to rise. Usually bias conditions and sensing layer parameters are designed to make this loss of charge relatively small when there is no irradiance on any sensing layer element but significant when irradiance reaches the photoconductive surface of any element. The maximum attainable value for this elemental loss in charge is determined by the maximum charge the beam can deliver upon returning to each element.

In a return beam type IR vidicon as each element is recharged by the scanning beam, a pulse of current is subtracted from the return beam. This beam is collected and amplified by electron multiplier dynodes. If none of the elements of the sensing layer have been irradiated during the last frame time, and the elements are uniform, each element would require the same charging current and the derived video would be constant. That is, the whole sensing layer would have the same gray level as seen on a TV monitor. If, however, the sensing layer was irradiated on only some portions of the layer, then the exposed elements would require more charging current resulting in a video pattern on the TV monitor. The resulting video is derived by displaying the differences in the amplitudes of the current pulses required to completely recharge the picture elements capacitors as the beam is sequentially scanned over the layer. The resistance of the photo-conductive shunt resistive element $r_e$ is also a function of sensing layer voltage, decreasing in resistance as the sensing layer voltage is increased. If, during normal tube operation, the sensing layer voltage is increased, a point will be reached when each elemental capacitor is discharged more during one frame time than the scanning beam can recharge. At this point the current pulses will be identical and maximum for all elements and the video as seen on a TV monitor will be uniformly white. This region of operation is called sensing layer voltage saturation.

It is therefore an object of this invention to provide a new method for improving the performance of vidicon camera tubes operating in the infra red spectrum.

It is another object of this invention to provide a new and improved method for improving the performance of vidicon camera tubes that requires little or no increase in cost.

It is a further object of the invention to provide a new and improved method for improving the performance of vidicon camera tubes that is simple to perform.

These and other advantages, features and objects of the invention will become more apparent from the following description taken in connection with the illustrative embodiment in the accompanying drawings.

DESCRIPTION OF THE DRAWINGS

FIG. 5 is a comparison of the example tubes in the steady state and pulsed modes.

DESCRIPTION OF THE PREFERRED EMBODIMENT

Figure 1:
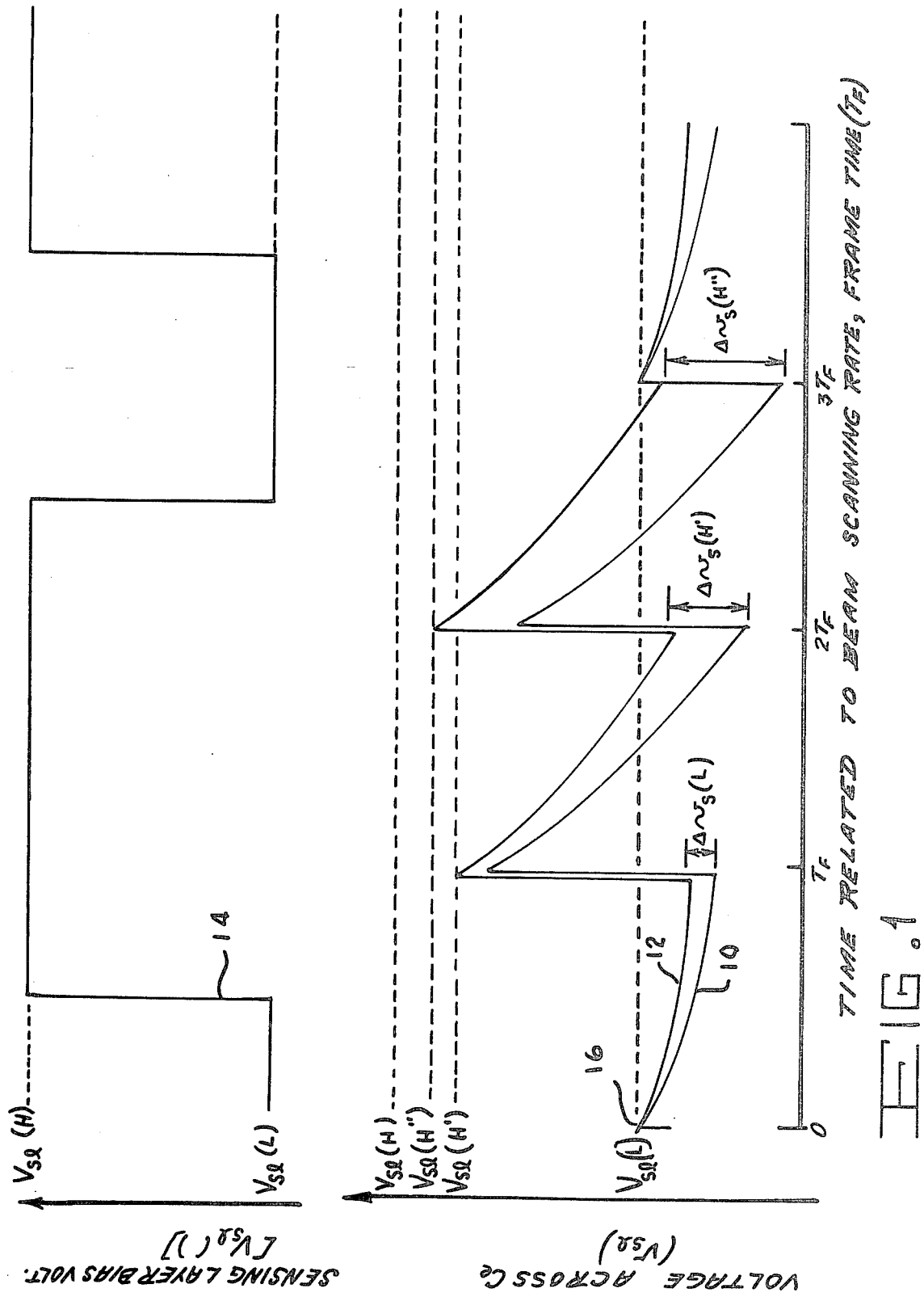
FIG. 1 is a graph showing bias and sensing layer voltage variation.

Improved camera tube performance achieved with this novel method can be explained in terms of the physical model referred to in the summary. The waveforms in FIG. 1, show the voltage variations across the capacitors of two adjacent resolution elements located in the center of a sensing layer. One of the elements (10) is being irradiated and the other (12) is dark. Also shown, in the same time reference, is the voltage (14) applied to the sensing layer. At the start 16 of the curves both elements have been charged completely by the beam to the normal sensing layer voltage $V_{sl}(L)$. After the beam has charged the elements and passed by, the elements begin to discharge exponentially toward zero. Because one element is being irradiated and the adjacent element is not, the rates of discharge are different resulting in a different charge on the two elements at the end of one frame time $T_f$. When the beam returns at the end of one frame time to recharge the elements, the sensing layer voltage is switched to a value above saturation. At this value of sensing layer voltage, the beam cannot recharge either element completely. The current charging pulses for both elements will be identical and the difference in charge on the two elements will be retained (or stored) for the start of the second frame. The voltage across the elements is higher in the second and third frames resulting in higher discharge rates and higher responsivity. At the end of the second frame the beam still cannot completely recharge the elements, resulting in the difference in charges being stored again for the start of the third frame. During the third frame the sensing layer voltage is switched back to its normal value. When the beam returns for the third frame it can completely recharge both elements and the difference in the charging current pulses represents the video signal. This video signal is then the sum of three frames of video, two of which were operating at higher than normal responsivity.

The improved performance predicted by the method of pulsing the sensing layer bias was experimentally verified with three infra red camera tubes each having a different image sensing layer material. These tubes all had dynode structures for return beam multiplication to isolate the pulsing operation from video amplification of signal. Initially, the transfer characteristic curve was determined for each tube operating at the normal sensing layer voltage bias for optimum performance. In each case, the transfer characteristic curve was measured in three repetitive pulsed modes: one low voltage pulse then one high voltage pulse [H/L], one low voltage pulse then two high voltage pulses [H H/L], and one low voltage pulse then three high voltage pulses [H H H/L]. This low voltage and one low voltage pulse level $V_{sl}(L)$ for greatest sensivity improvement was found to be approximately equal to or slightly above the optimum sensing layer voltage in normal operation. The high voltage pulse level $V_{sl}(H)$ for greatest sensitivity improvement was found to occur at values 50 to 122% higher than $V_{sl}(L)$.

Figure 2:
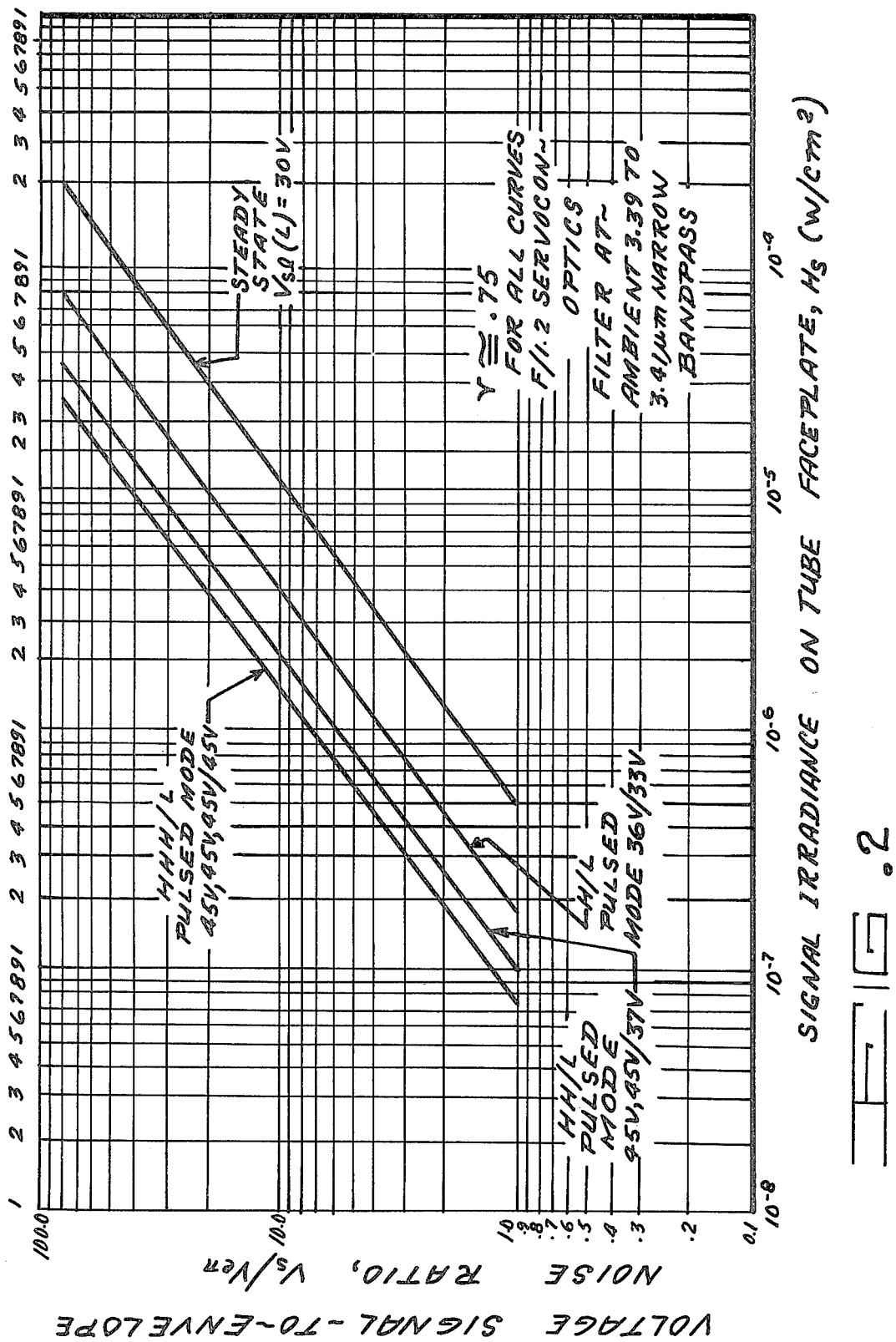
FIG. 2 is a graph showing transfer characteristics for one example vidicon tube.

The RCA Iricon used in the example has a photoconductive sensing layer of deposited lead telluride operated at liquid nitrogen temperature (77° K.) with an all-electrostatic gun structure as the scanning mechanism. FIG. 2 shows the Iricon transfer characteristics for normal and pulsed operations. For this camera tube sensitivity and dynamic response improved by factors of 5.4 and 2.5, respectively, at a two to one pulsed operation ratio, 45v45v/37v. At three to one pulsed operation, 45v45v45v/40v sensitivity improved by a factor of 7.2. The dynamic response exceeded the measurable range in the laboratory but based on the trend at lower pulsed ratios, it can be assemed to have improved by a factor of 2.7.

Figure 3:
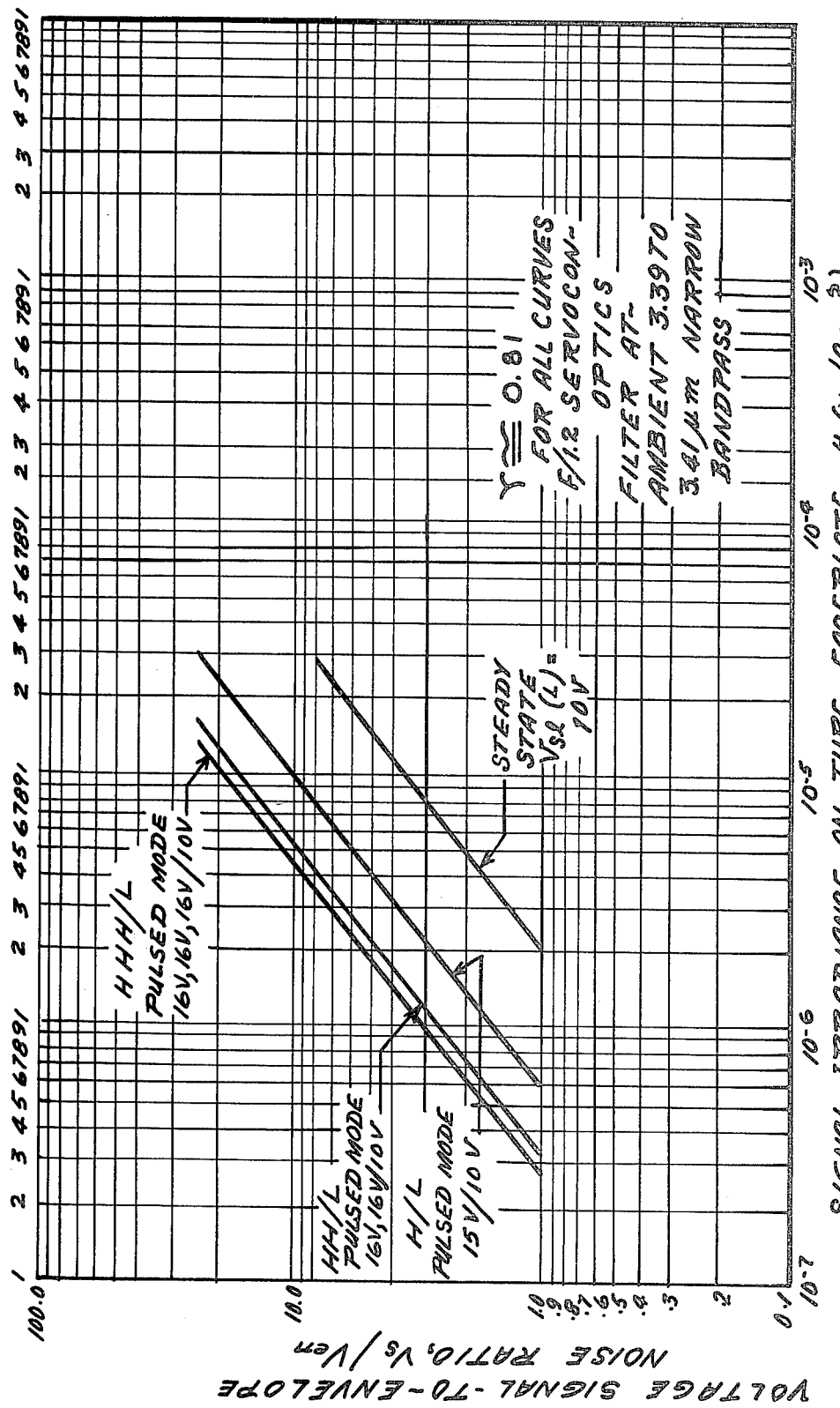
FIG. 3 is a graph showing transfer characteristics for another example vidicon tube.

The General Electric Infrared Vidicon type 2793A used in the example has an extrinsic photoconductive sensing layer of copper doped germanium counter doped with antimony. This sensing layer is a crystal slice operated at liquid nitrogen temperature with an electrostatic gun structure and magnetic alignment coil comprising the scanning mechanism. FIG. 3 shows the transfer characteristics of this vidicon for ormal and pulsed operations. For this camera tube sensitivity and dynamic response improved by factors of 7:1 and 3:2, respectively, at a two to one pulsed operation ratio, 16v16v/10v. At three to one pulsed operations, 16v16v16v/10.5v, sensitivity and dynamic response improved by factors of 8:1 and 3:5, respectively.

Figure 4:
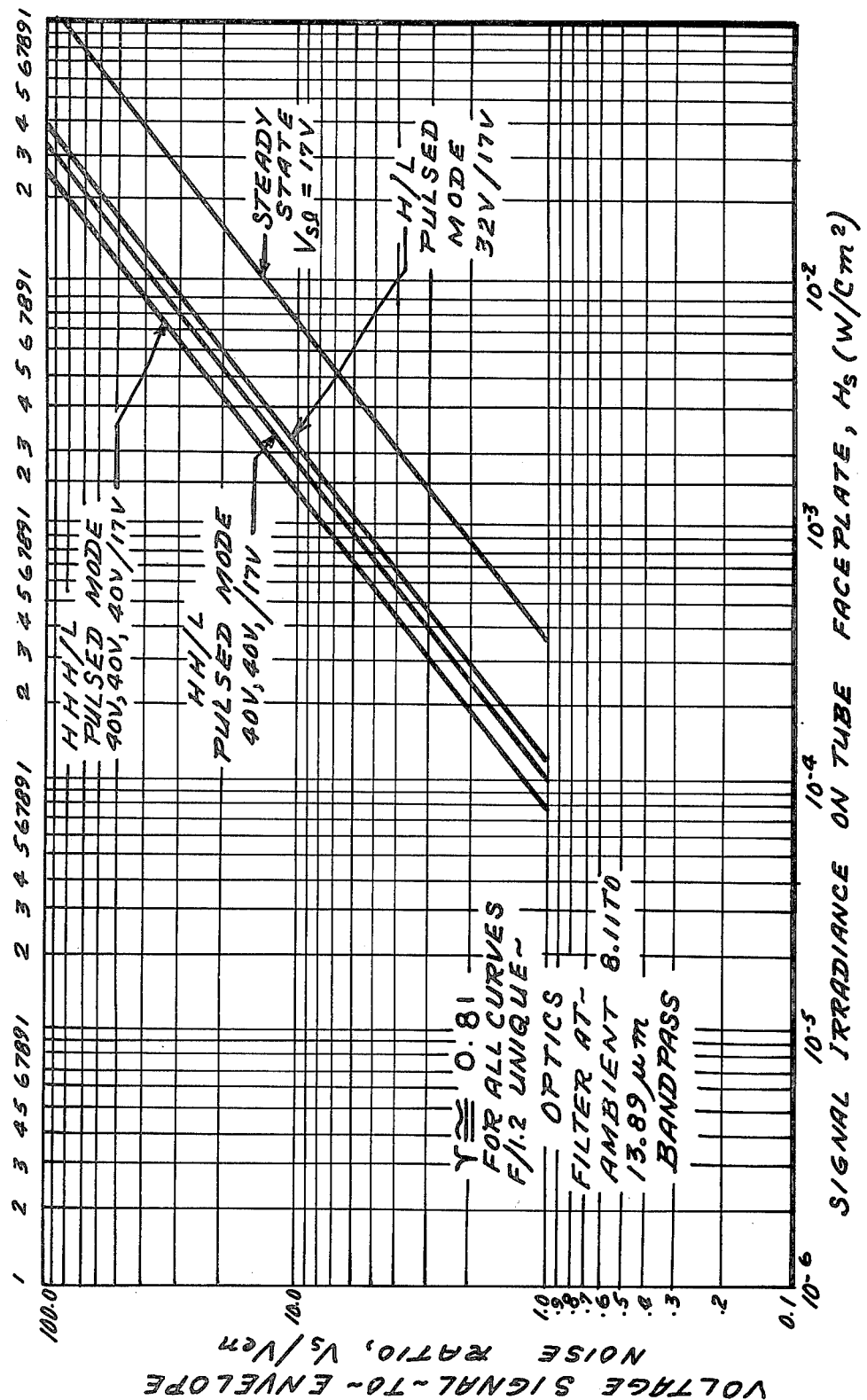
FIG. 4 is a graph showing transfer characteristics for still another example vidicon tube.

The Westinghouse Thermicon used in the example has a termistor sensing layer of smoke deposited arsenic trisulfide operated at ambient temperatures (300° K.) with an all-electrostatic gun structure as the scanning mechanism. FIG. 4 shows the Thermicon transfer characteristics for normal and pulsed operations. For this camera tube sensitivity and dynamic response improved by factors of 3.6 and 1.9, respectively, at a two to one pulsed operation ratio, 42v42v/17v. At three to one pulsed operation, 40v40v40v/17v, sensitivity improved by a factor of 4.6. The dynamic response exceeded the measurable range in the laboratory but based on the trend at lower pulsed ratios it can be assumed to have improved by a factor of 2.1.

A comparison of the improved performance obtained from the three tubes with this new pulsing technique is shown in Table 1 (FIG. 5). In all cases both sensitivity and dyanmic range increased at a decreasing rate as the number of successive high pulsed frame times was increased. From this data it is evident that pulse ratios greater than two to one yield less than twenty percent improvement in sensitivity and dynamic response. At a three to one pulse ratio, image retention time for the RCA and Westinghouse tubes tended to become longer and non-uniformities on all the tube sensing layers tended to broaden indicating tube saturation. Based on this data, the two to one pulse ratio presently constitutes an optimum compromise between transfer characteristics and image quality. None of the pulsed modes described here produced any detectable change in tube gamma or resolution.

Current techniques used to achieve improved camera tube sensitivity are based on integrating many frames of data over intervals of several seconds or minutes and subtracting no signal frames from frames with signal. By comparison this new method has the advantage of improving camera tube response in real time by synchronously pulsing sensing layer bias without requiring any change in scanning beam rate or subsequent data processing of recorded video data. Also this technique can be used in addition to the aforementioned methods to obtain a higher degree of image enhancement. The application of this novel technique was found experimentally to yield a real time increase in tube sensitivity approaching an order of magnitude.

All camera tubes used to experimentally verify this new technique had electron gun structures with return beam multiplication. This additional tube feature isolated dc level variations produced by pulsing $V_{sl}$ from the video signal modulating the electron beam. If the video was taken directly off the sensing layer in a method old in the art, a gating circuit synchronized with the $V_{sl}$ pulsing rate would be needed between video amplifier and tube sensing layer to provide a constant transient free voltage level for low-noise video amplifier. This additional requirement would increase the complexity of the television electronics and probably compromise the noise figure characteristics of the video amplifier. In the return beam design the video modulation reaching the dynodes does not contain the pulsed sensing layer voltage. The video amplifier is capacitively coupled to the anode of the dynode structure which is maintained at a constant dc voltage level.

This new technique is directly applicable to both visible light and infrared camera tubes that conform to the operational principles described herein. However, isolation of the sensing layer bias ($V_{sl}$) from the video signal must be provided either electronically at the preamplifier input or by a dynode structure assoicated with electron beam.

Although the invention has been described with reference to a particular embodiment, it will be understood to those skilled in the art that the invention is capable of a variety of alternative embodiments within the spirit and scope of the appended claims.

We claim:

1. A method for improving performance of return beam type infra red vidicon camera tubes in a television system comprising the steps of: directing the camera window toward incident optical irradiance; fully charging each element of the vidicon image sensing layer sequentially with an electron beam; exposing the sensing layer to an image containing infra red radiation for one television frame time and allowing the irradiance to selectively discharge the sensing layer; recharging the image sensing layer a first time, to a voltage that substantially saturates the image sensing layer, sequentially with a scanning electron beam; continuing to expose the sensing layer to an image containing infra red radiation for one television frame time and allowing other irradiance to selectively discharge the sensing layer; recharging the image sensing layer a second time, to a voltage that substantially saturates the image sensing layer sequentially with a scanning electron beam; continuing to expose the sensitive layer of an image containing infra red radiation for one television time frame and allowing the irradiance to selectively discharge the sensing layer; recharging the image sensing layer a third time to a voltage fully charging said layer; measuring the current of the return charging beam and amplifying said beam by electron multiplier dynodes and directing the amplifier signal to a television display unit.

* * * * *